(No Model.)

R. W. PROSSER.
SAW TOOTH.

No. 272,319. Patented Feb. 13, 1883.

Witnesses
Ed. L. Moran
Fred. Hayner

Inventor
Robert W. Prosser
by his Attorneys
Brown & Brown

UNITED STATES PATENT OFFICE.

ROBERT W. PROSSER, OF TRENTON, NEW JERSEY.

SAW-TOOTH.

SPECIFICATION forming part of Letters Patent No. 272,319, dated February 13, 1883.

Application filed September 19, 1882. (No model.)

*To all whom it may concern:*

Be it known that I, ROBERT W. PROSSER, of the city of Trenton, in the county of Mercer and State of New Jersey, have invented a new and useful Improvement in Insertible-Tooth Saws; and I do hereby declare that the following is a full and exact description of the construction and operation of the same, reference being had to the accompanying drawings, which form a part of this specification.

My invention relates particularly to those insertible teeth for saws which are fitted with a groove into a recess or bearing in the saw-plate, having a circular curvature, and secured by a rivet inserted partly in the tooth and partly in the plate.

The invention consists in the combination, in an insertible-tooth saw, of a plate having a recess or bearing of circular curvature, with an abutment at its inner end, a tooth having a back of corresponding curvature and made to fit said abutment, the said plate and tooth being fitted together with a groove, and a rivet inserted in said tooth and plate in a position between the said abutment and the prolongation of a diametral line drawn from the outer termination of said recess or bearing.

Figure 1:
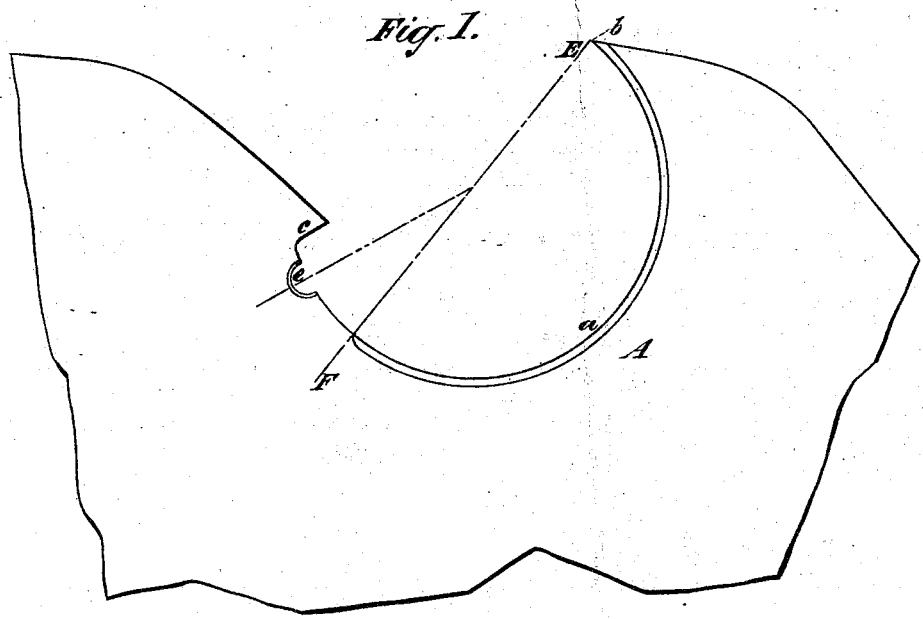
Figure 2:
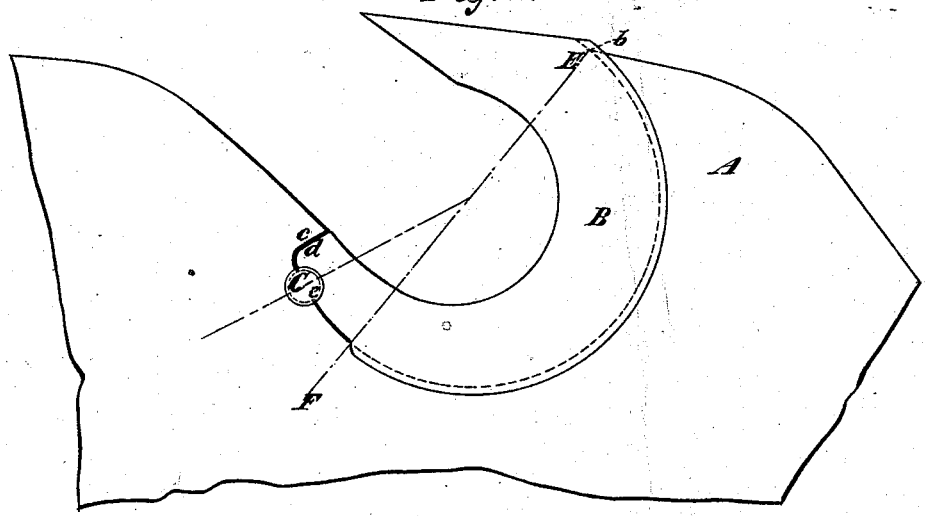
Figure 3:
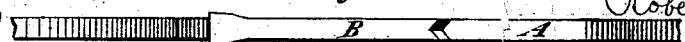

In the accompanying drawings, Figure 1 is a side view of a portion of a saw-plate prepared for the reception of a tooth. Fig. 2 is a side view of a similar portion of the saw-plate with the tooth inserted and secured by the rivet. Fig. 3 is an edge view corresponding with Fig. 2.

A is the saw-plate. B is the tooth, and C the rivet. The recess or bearing $a$ in the plate is milled out in the usual way, to fit the back of the tooth, for a distance from its outer extremity, $b$, equal to or greater than half the circumference of a circle, and thence is prolonged some distance to provide for the insertion of the rivet C, and it is represented as terminating in a shoulder or abutment, $c$, against which the heel $d$ of the tooth abuts, and by which any tendency of the tooth to turn in its recess or bearing while at work is resisted. The back of the tooth conforms to the circular curvature of the recess $a$, and the tooth is similarly prolonged beyond a semicircle to receive the rivet C and form the heel which abuts against the abutment $c$. The rivet C, which is inserted in a hole, $e$, formed partly in the tooth and partly in the plate, has the said hole provided for it in a position on the outer side of the prolongation of the diametral line E F, drawn from the outer extremity of the circular recess or bearing $a$, and between said line and the abutment $c$, as shown in Figs. 1 and 2 of the drawings. The object of placing the rivet in this position is to hold the tooth in position by forcing the back of the tooth into its groove near the extremity $b$ of the recess in the plate, and it also performs the function of preventing the tooth turning round in the groove.

This tooth is applicable to either circular or other saws.

In milling the teeth the diameter may be either of the exact size of the recess in the saw-plate or slightly larger, so as to give them some spring when inserted in plate. The tendency of the end D of the tooth to twist out of the plate is resisted by the countersink of the rivet.

What I claim as my invention, and desire to secure by Letters Patent, is—

The combination, in an insertib'e-tooth saw, of a plate having a recess or bearing of circular curvature, with an abutment at its inner end, a tooth having a back of corresponding curvature and made to fit the said abutment, the said plate and tooth being fitted together with a groove, and a rivet inserted in said tooth and plate in a position between the said abutment and a prolongation of a diametral line drawn from the outer termination of said recess or bearing, substantially as and for the purpose herein described.

ROBERT W. PROSSER.

Witnesses:
FREDK. HAYNES,
ED. L. MORAN.